United States Patent [19]

Raymond et al.

[11] Patent Number: 4,566,835
[45] Date of Patent: Jan. 28, 1986

[54] NUCLEAR FUEL PELLET SINTERING BOAT LOADING SYSTEM

[75] Inventors: Theodore E. Raymond, Swansea; Thomas B. Huggins, Columbia; George E. Vining, West Columbia, all of S.C.

[73] Assignee: Westinghouse Electric Corp., Pittsburgh, Pa.

[21] Appl. No.: 536,934

[22] Filed: Sep. 28, 1983

[51] Int. Cl.[4] .................... B65G 57/08; B65G 57/10
[52] U.S. Cl. ........................................ 414/53; 53/168; 53/245; 53/534; 53/535; 198/441; 414/68; 414/81; 414/89; 414/110
[58] Field of Search .................. 414/51, 53, 57, 68, 414/81, 86, 89, 110; 53/168, 245, 247, 534, 535, 542; 198/436, 441

[56] References Cited

U.S. PATENT DOCUMENTS

| | | | |
|---|---|---|---|
| 1,580,670 | 4/1926 | Nagy | 198/441 X |
| 3,027,020 | 3/1962 | McCoy | 414/59 |
| 3,627,150 | 12/1971 | Kazeef et al. | 414/63 |
| 3,789,575 | 2/1974 | Bross | 53/534 |
| 4,332,120 | 6/1982 | Haynes et al. | 53/245 |
| 4,468,163 | 8/1984 | King et al. | 414/110 X |

FOREIGN PATENT DOCUMENTS 444731  2/1968  Switzerland .................. 414/57

Primary Examiner—Leslie J. Paperner
Attorney, Agent, or Firm—D. E. Erickson

[57] ABSTRACT

A system for loading nuclear fuel pellets into a sintering boat from a pellet press which discharges newly-made pellets. The loading system includes apparatus for receiving the pellets from the press and inserting them into an upward vertically positioned channel, a horizontally positioned rotatable drum with at least one longitudinally aligned circumferential channel, previously mentioned, for holding a row of pellets, a drum rotating mechanism, a device for pushing the pellets out of a below-horizontally positioned channel, an incline to receive the pushed out pellets, a sintering boat, a sintering boat/incline positioner to allow the pellets to leave the incline adjacent the position in the sintering boat of the next-to-be-stacked pellet row, and a controller to coordinate system component operation.

10 Claims, 4 Drawing Figures

NUCLEAR FUEL PELLET SINTERING BOAT LOADING SYSTEM

BACKGROUND OF THE INVENTION

The present invention relates generally to handling nuclear fuel pellets and more particularly to a system for loading newly-made (green) nuclear fuel pellets into a sintering boat from a pellet press.

An operational step in the nuclear fuel fabrication process is the loading of green nuclear fuel pellets, which have been ejected from the pellet press, into sintering containers, "boats", in preparation for high-temperature firing of the pellets in a sintering furnace. This operation requires careful handling of the pellets, because the pellets at this time are fragile and susceptible to damage.

It is known in the prior art to load nuclear fuel pellets into a sintering boat by a gravity discharge from the pellet press down a chute into the boat. This method has the disadvantage of allowing pellet to pellet impact and has considerable potential for pellet damage. In addition, random orientation of the pellets in each sintering boat reduces the loading density and therefore reduces the high-temperature firing production capacity.

A mechanized boat loader also is known, in the prior art, which includes a pick and place mechanism with mechanical blades or jaws to pick up a single row of nuclear fuel pellets at a time and to transfer that row into the sintering boat. If further is known to utilize a boat loader with a vacuum transfer head which lowers onto an array of nuclear fuel pellets, applies a vacuum to lift the pellets, and transfers the array to load a complete layer of pellets into the sintering boat at one time. These two methods have the disadvantage of requiring frequent attention to maintain the pick and place mechanisms operational.

U.S. Pat. No. 4,332,120 discloses apparatus for loading nuclear fuel pellets, via gravity, into a container supported by a platform which lowers under increasing pellet weight thereon.

U.S. Pat. No. 3,027,020 discloses a rotating drum with longitudinally aligned circumferential channels to load rows of cans onto a conveyor.

What is needed is a relatively maintenance free sintering boat loader which achieves high loading density without nuclear fuel pellet damage.

SUMMARY OF THE INVENTION

Briefly stated, the invention is directed towards a system for loading nuclear fuel pellets into a sintering boat from a pellet press which discharges newly-made pellets. The loading system includes a horizontally positioned rotatable drum with at least one longitudinally aligned circumferential channel for holding a row of pellets, a drum rotating mechanism, apparatus for receiving the pellets from the press and inserting them into an upward vertically positioned channel, a device for pushing the pellets out of a below-horizontally positioned channel, an incline to receive the pushed out pellets, a sintering boat/incline positioner to allow the pellets to leave the incline adjacent the position in the sintering boat of the next-to-be-stacked pellet row, and a controller to coordinate the operation of the above-described components of the loading system. The channel is open at one end of the drum for accepting a row of pellets from the pellet receiving/inserting apparatus. The drum rotating mechanism rotates the channel from the upward vertical position to the below-horizontal position and around to the upward vertical position.

BRIEF DESCRIPTION OF THE DRAWINGS

The subject matter of the invention is particularly pointed out and distinctly claimed in the concluding portion of this specification. The invention, however, both as to organization and method of operation, together with further advantages thereof, may best be understood by reference to the following description taken in connection with the accompanying drawings in which:

DETAILED DESCRIPTION OF THE INVENTION

Figure 1:
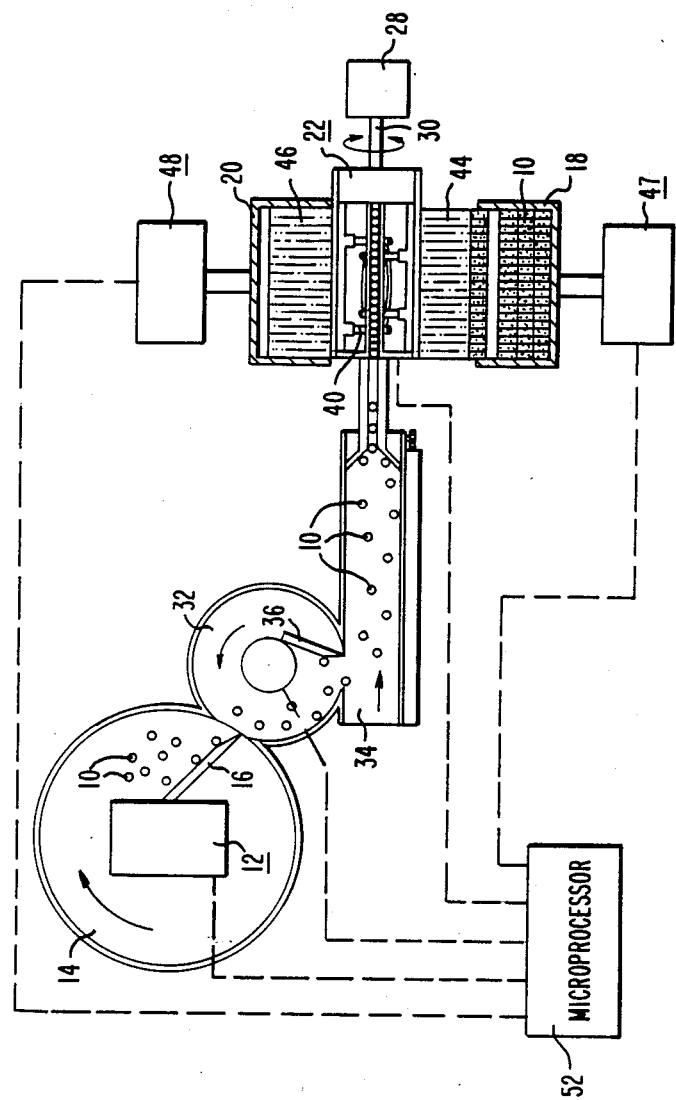
FIG. 1 is a schematic planar view of a preferred embodiment of the nuclear fuel pellet sintering boat loading system of the invention.
Figure 3:
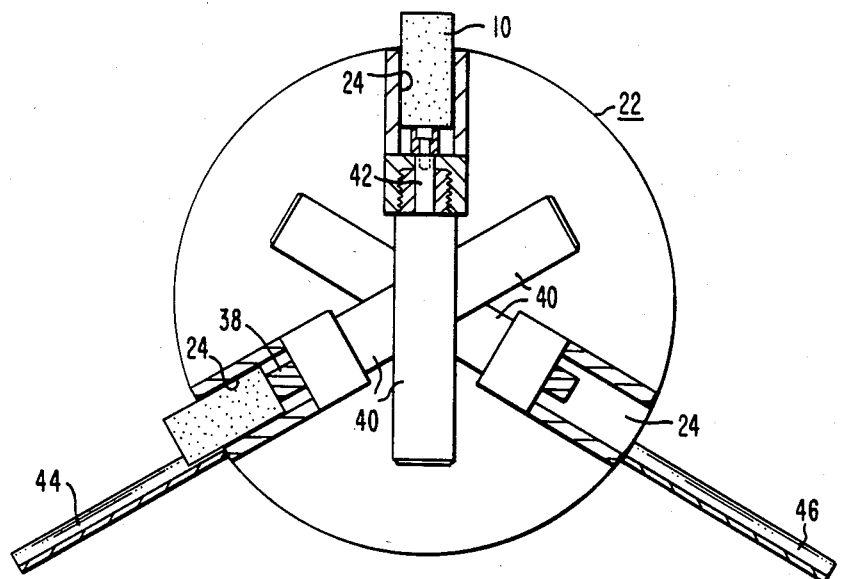
FIG. 3 is an enlarged side elevational view of the rotating drum area shown in FIG. 1.
Figure 2:
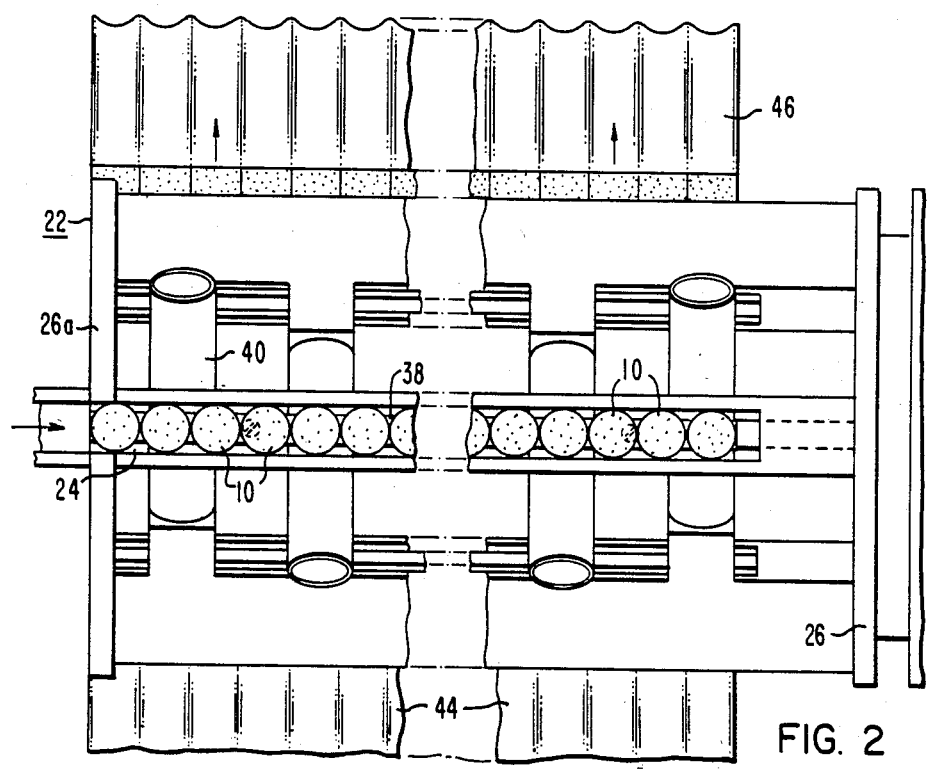
FIG. 2 is an enlarged planar view of the rotating drum area shown in FIG. 1.

Reference will now be made in detail to several present preferred embodiments of the invention, an example of which is illustrated in the accompanying drawings. In the drawings, like reference characters designate like or corresponding parts. A preferred embodiment of the nuclear fuel pellet sintering boat loading system is shown in FIG. 1, with details of the rotating drum area shown in FIGS. 2 and 3, and with details of the sintering boat/drum area shown in FIG. 4. Newly-made nuclear fuel pellets 10 are formed by a pellet press 12 which includes a first turntable 14 and a first stationary wiper arm 16 to eject the pellets 10 therefrom. The system of the invention loads the pellets 10 into a first sintering boat 18 and then loads other pellets 10 from the press 12 into a second sintering boat 20 while the full first sintering boat 18 is replaced with an empty boat. This permits continuous pellet loading operations.

The loading system includes a generally horizontally disposed rotatable drum 22. At least one channel 24 is provided between the drum's two ends 26. The channel 24 is sized to hold a row of pellets 10, and is generally circumferentially disposed and longitudinally aligned. The channel 24 has an open end at one end 26a of the drum 22. Preferably, the drum 22 has exactly three channels 24, each being circumferentially located on the drum 22 generally 120 degrees apart from each other.

There is also provided means for rotating the drum 22 to rotate the channels 24 from a generally upward vertical position to a first generally below-horizontal position and around to the upward vertical position. Preferably, the drum rotating means also includes means for counterrotating the drum 22 to counterrotate the channel 24 from the upward vertical position to a second generally below-horizontal position and around to the upward vertical position. The second position is located between the vertical position and the first position. Preferably, the drum rotating and counterrotating means include a motor 28 connected to the drum 22 by a shaft 30. It is desirable that the first below-horizontal position be generally 120 degrees from the upward vertical position, and that the second below-horizontal position be generally 120 degrees from the upward vertical position and from the first below horizontal position.

The loading system also includes means for receiving the pellets 10 ejected from the pellet press 12, and for inserting the row of ejected pellets 10 into the channels 24 from their open ends when the channels 24 are disposed at the upward vertical position. Preferably the pellet receiving and inserting means includes: a pellet transfer turntable 32 which receives pellets 10 ejected for the pellet press 12, a stationary transfer wiper arm 35 which guides pellets 10 off the transfer turntable 32, and a conveyor 34 for receiving the pellets 10 guided off the transfer turntable 32 by the transfer wiper arm 36, for carrying the pellets 10 to the drum 22, and for having the pellets in front be pushed into the channel 24 by the pellets behind which are still on the conveyor 34. A standard pellet press 12 will eject the standard right circular cylindrically-shaped pellets 10 such that they will be standing up. The conveyor 34 is designed so that any horizontally lying pellets will fall away from the conveyor into a collector (not shown). This is accomplished by slightly tilting an area of the conveyor belt using a camming surface underneath (also not shown). The preferred belt receiving and inserting means previously described will maintain pellet orientation in that the pellets 10 will be inserted in the channel 24 such that the pellets 10 are generally vertical. Other pellet receiving and inserting means include vibratory feeders; pick and place mechanisms; and the like.

Means are additionally provided for pushing the row of held pellets 10 radially outward from the channel 24 to discharge them therefrom when the channel 24 is disposed at its first below-horizontal position. Preferably such means also includes means for pushing the row of held pellets 10 radially outward from the channel 24 to discharge them therefrom when the channel 24 is disposed at its second below-horizontal position. A desired such means has each channel 24 with a radially moving bottom bar 38 supporting the entire row of pellets 10, and also includes powered cylinders 40 (pneumatic, hydraulic, electric, and the like) whose moving shafts 42 are connected to the corresponding bottom bar 38. Other such means has each channel with a stationary bottom member having a slit through which a first ejector bar can pass when the channel is at the first below-horizontal position and through which a second ejector bar can pass when the channel is at the second below-horizontal position; and the like. Additional such means includes gravity and the sides of the channels 24 having smooth surfaces so that the pellets 10 simply fall out of the below-horizontally positioned channels 24 on their own onto inclines 44 and 46, which are described hereafter. An additional mechanical push, as previously described, is recommended to assure positive pellet discharge.

The invention additionally has a first incline 44 located with its upper end generally adjacent the channels 24 when they are disposed at the first below-horizontal position. Preferably, there is included a second incline 46 located with its upper end generally adjacent the channels 24 when they are disposed at the second below-horizontal position. Pellets 10 discharged from the channels 24 at the first below-horizontal position slide down the first incline 44 and those discharged at the second below-horizontal position slide down the second incline 46. The inclines 44 and 46 desirably are each tilted downward generally 30 degrees from horizontal. Preferably the inclines 44 and 46 each have grooves for guiding the sliding pellets 10.

Means are further provided for relatively positioning the first sintering boat 18 and the lower end of the first incline 44 such that the first incline sliding pellets 10 leave the first incline 44 generally adjacent the position in the first sintering boat 18 of the predetermined next-to-be-stacked row of pellets 10 to be loaded into the first sintering boat 18. Preferably such relative positioning means include means for relatively positioning the second sintering boat 20 and the lower end of the second incline 46 such that the second incline sliding pellets 10 leave the second incline 46 generally adjacent the position in the second sintering boat 20 of the preselected next-to-be-stacked row of pellets 10 to be loaded into the second sintering boat 20. It is desirable that the relative positioning means orients the bottom of the first sintering boat 18 generally perpendicular to the first incline 44 and orients the bottom of the second sintering boat 20 generally perpendicular to the second incline 46. A recommended order for stacking the pellet rows in the sintering boats 18 and 20 would place the first row of pellets 10 in the lower corner, the second row on top of the first row along the lower side, the third row on top of the second row along the lower side, etc., until the entire lower side has recieved a complete layer of pellets. Then the next-to-be-stacked pellet row would be placed near the lower corner on top of the first pellet row, and the process repeated until the sintering boat is fully loaded with pellets. At any stage in the pellet loading operation, the next-to-be-stacked pellet row is predetermined or preselected based on the particular pellet stacking order chosen.

Figure 4:
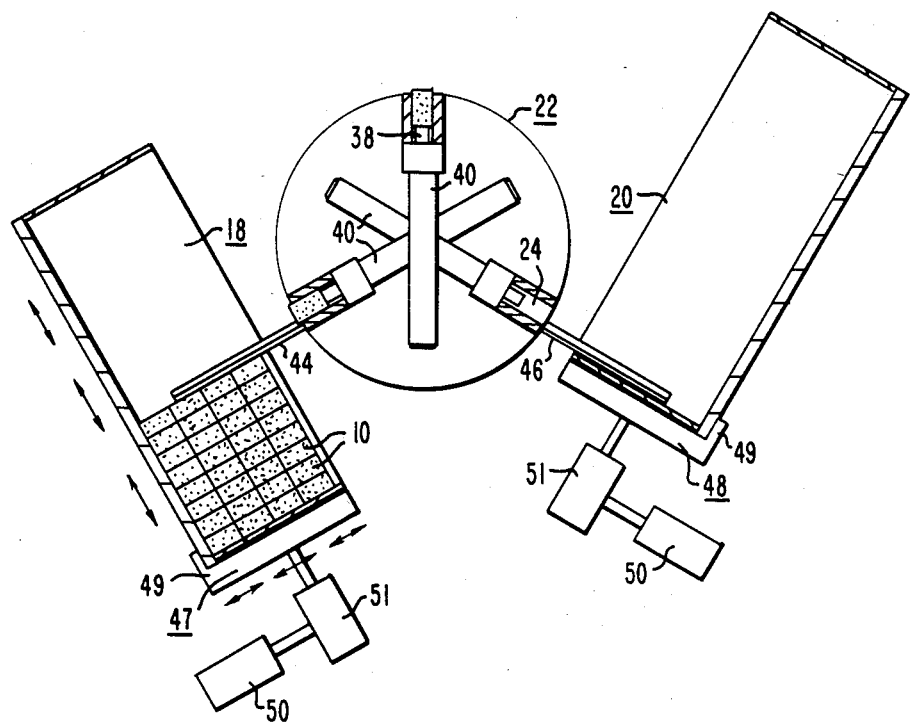
FIG. 4 is a schematic side elevational view of the rotating drum and sintering boat area shown in FIG. 1.

A preferred relative positioning means includes a standard two directional sliding table 47 and 48 for each sintering boat 18 and 20, with the sliding table 47 and 48 capable of being indexed (and therefore moving a sintering boat) by generally one pellet length in one direction and by generally one pellet diameter in a perpendicular direction. The inclines 44 and 46 are stationary in this case. The sliding tables 47 and 48 are best seen in FIG. 4 where they are schematically represented by a boat support 49 moved in one direction by a first positioning powered cylinder 50 and moved in a perpendicular direction thereto by a second positioning powered cylinder 51. Other relative positioning means includes: a movable bottom member for each incline and a corresponding standard one directional sliding table for moving the sintering boat perpendicular to the direction of movement of the incline's bottom member; a robot arm for positioning each sintering boat; and the like.

The invention further includes means for controlling the pellet receiving and inserting means, the drum rotating means, the relative positioning means, and the pellet pushing means. Preferably such means includes a microprocessor 52, or the like, for coordinating the operation of the system components previously discussed.

Although the system could be operated to alternately load one row of pellets 10 at a time into each of the sintering boats 18 and 20 (in which case only 2 channels 24 are needed), it is preferred that the microprocessor 52 be programmed to completely load one sintering boat before beginning to load the second sintering boat. As previously mentioned, this enables continuous pellet loading operation without shutting the system down to change out sintering boats.

A cycle of operation has the conveyor 34 carrying a stream of upright pellets 10 from the pellet transfer turntable 32 which received them from the pellet press 12. A first row of pellets 10 is pushed into a (first) vertically aligned channel 24 on the drum 22 by the pellets 10 still on the conveyor 34 (tripping a switch (not shown) indicating the channel 24 is full). The drum 22 rotates (by the motor 28) to the first 120 degree position, leaving the leading pellet on the conveyor 34 to abut the end of the rotating drum 22 until the next (second) channel 24 comes into vertical position allowing a second row of pellets onboard. At the first 120 degree position, the powered cylinder 40 causes the bottom bar 38 of the (first) channel 24 to move radially outward, positively discharging the first row of pellets onto the first incline 44. The pellets 10 slide off the first incline 44 into the first sintering boat 18 proximate its lower corner. The first sliding table 47 then indexes the first sintering boat 18 to receive the next-to-be-stacked pellet row, as the drum 22 rotates the (second) channel 24 holding the second row of pellets to the first 120 degree position. At this position the third row of pellets 10 enters the (third) vertical channel 24 as the second row of pellets 10 are discharged from the (second) 120 degree positioned channel 24. After the first sintering boat 18 is loaded, the drum 22 counterrotates to discharge the pellets 10 at the second 120 degree position into the second sintering boat 20 utilizing the second incline 46 and the second sliding table 48, with all operations controlled by the microprocessor 52.

Different sized pellets 10 or sintering boats 18 and 20 would require appropriately sized interchangeable (or adjustable) system components, as can be appreciated by those skilled in the art.

It will be apparent that many modifications and variations are possible in light of the above teachings. It, therefore, is to be understood that within the scope of the appended claims, the invention may be practiced other than as specifically described.

We claim:

1. A system for loading nuclear fuel pellets into a first sintering boat from a pellet press which ejects newly-made said pellets, said system comprising:
   (a) a generally horizonally disposed rotatable drum having two ends and having therebetween at least one generally circumferentially disposed and longitudinally aligned channel for holding a row of said ejected pellets, with said channel having an open end at one end of said drum;
   (b) means for rotating said drum to rotate said channel from a generally upward vertical position to a first generally below-horizontal position and around to said upward vertical position;
   (c) means for receiving said pellets ejected from said press, and for inserting said row of said ejected pellets into said channel from its said open end when said channel is disposed at its said upward vertical position;
   (d) means for pushing said row of said held pellets radially outward from said channel to discharge them therefrom when said channel is disposed at its said first below-horizontal position;
   (e) a first incline disposed with its upper end generally adjacent said channel, when said channel is disposed at its said first below-horizontal position, to slidingly receive said first position discharged pellets;
   (f) means for relatively positioning said first sintering boat and the lower end of said first incline such that said first incline sliding pellets leave said first incline generally adjacent the position in said first sintering boat of the predetermined next-to-be-stacked said row of said pellets to be loaded into said first sintering boat; and
   (g) means for controlling said pellet receiving and inserting means, said drum rotating means, said relative positioning means, and said pellet pushing means.

2. The system of claim 1 also for loading nuclear fuel pellets into a second sintering boat from said press;
   wherein said drum rotating means also includes means for counterrotating said drum to counterrotate said channel from said upward vertical position to a second generally below-horizontal position, located between said upward vertical position and said first below-horizontal position, and around to said upward vertical position;
   wherein said pellet pushing means also includes means for pushing said row of said held pellets radially outward from said channel to discharge them therefrom when said channel is disposed at its said second below-horizontal position;
   also including a second incline disposed with its upper end generally adjacent said channel, when said channel is disposed at its said second below-horizontal position, to slidingly receive said second position discharged pellets; and
   wherein said relative positioning means also includes means for relatively positioning said second sintering boat and the lower end of said second incline such that said second incline sliding pellets leave said second incline generally adjacent the position in said second sintering boat of the preselected next-to-be-stacked said row of said pellets to be loaded into said second sintering boat.

3. The system of claim 2, wherein said drum has a total of three said channels, each of said channels circumferentially located generally 120 degrees apart from each other.

4. The system of claim 3, wherein said first below-horizontal position is generally 120 degrees from said upward vertical position, and said second below-horizontal position is generally 120 degrees from said upward vertical position and from said first below-horizontal position.

5. The system of claim 4, wherein said first and said second inclines are each tilted downward generally 30 degrees from horizontal.

6. The system of claim 5, wherein said relative positioning means orients the bottom of said first sintering boat generally perpendicularly to said first incline and orients the bottom of said second sintering boat generally perpendicular to said second incline.

7. The system of claim 1, wherein said channel has a radially moving bottom member and wherein said pellet pushing means pushes said pellets by radially moving said bottom member.

8. The system of claim 1, wherein said pellet receiving and inserting means inserts said pellets into said channel such that said pellets are generally vertical.

9. The system of claim 1, wherein said first incline has grooves for guiding said sliding pellets.

10. The system of claim 1, wherein said relative positioning means moves said first sintering boat, and said first incline is stationary.

* * * * *